LUDWIG WITTROCK
*INVENTOR.*

BY Karl F. Ross

AGENT

LUDWIG WITTROCK
*INVENTOR.*

BY *Karl F. Ross*
AGENT 3,043,480
FEED MECHANISM FOR LIQUEFIABLE
COMMINUTED MATERIAL
Ludwig Wittrock, Marl, Westphalia, Germany, assignor to Gewerkschaft Schalker, Eisenhutte, Gelsenkirchen-Schalke, Germany, a corporation of Germany
Filed Feb. 28, 1961, Ser. No. 92,267
Claims priority, application Germany Mar. 25, 1960
5 Claims. (Cl. 222—146)

My present invention relates to apparatus for spraying or injecting a liquefiable comminuted material, such as an injection-molding machine, and more particularly to the feeding mechanism of a machine used for molding or spraying thermoplastic and similar materials.

The functions to be performed by injection-molding machines as ordinarily encountered in the art include the mixing, kneading and mastication of the introduced powdered or granular molding material, and the conveyance of this material towards the injection nozzle. The above functions pose the problem of providing relatively simple masticating and conveying means which operate effectively with the various types and qualities of molding materials encountered, including unprepared or moist powder, and which advantageously also promote the degasification of the material to be injected. Heretofore, this has been realized only to a limited extent.

My invention has, accordingly, for its principal object the provision of improved means for conveying a liquefiable granular material from the charging hopper to a spray or injection nozzle.

It is another object of my present invention to provide more efficient mixing and kneading means for such liquefiable material.

A still further object of my present invention is to provide a novel combination of conveying, mixing and kneading means with a view to simplifying the design of an injection-molding machine.

It is also an object of my present invention to design the above means in such manner as to facilitate degasification of the material to be sprayed or injected.

An important feature of my invention resides in the provision of a tubular housing communicating with a charging hopper to receive the liquefiable comminuted material, a centrally located driven feed screw extending from the vicinity of the inner hopper opening toward a discharge port, and several outer planetary feed screws disposed in a preferably symmetrical array near the inner hopper opening and engaged by the thread on the central screw and a complementary thread on the inner surface of the tubular housing. The planetary screws may be substantially coextensive with the central screw, all of them terminating in the vicinity of the discharge port, or may extend over only part of its length (e.g. halfway), the external diameter of the central screw and/or the internal diameter of the housing being in the latter instance appropriately stepped at a location beyond the ends of the planetary screws to bring the central screw into closer contact with the inner surface of the housing. The pitch angle of the screw threads may be constant along the whole length or may progressively decrease, in steps or in a continuous manner, from the inlet end to the outlet end thereof. The discharge port, which preferably is axially aligned with the central screw, may open directly into the mold chamber to act as an injection nozzle or may communicate with a generally transverse injection cylinder accommodating a reciprocable plunger; in the last-mentioned case the housing is advantageously coaxial with the hopper at the end remote from the cylinder. In principle, the axis of the hopper may lie at any angle to that of the housing, though being preferably perpendicular thereto or aligned with it.

Generally, the threads of the feed screw and of the housing may be considered as formed by gear teeth, preferably of involute shape, which extend at an inclination to the housing axis over at least a major part of their length; near the outlet end these teeth may be parallel to the housing axis to form spur gears which help to center the screws and assist in the mastication of the material extruded therebetween without imparting further axial motion thereto. The secondary or planetary feed screws revolve about the center screw at a fraction of the rotary speed of the latter while rotating about their own axes at a speed determined by the ratio of their diameter to that of the center screw.

The above and other objects, features and advantages of my invention will become more readily apparent from the following description, reference being made to the accompanying drawing in which.

Figure 1:
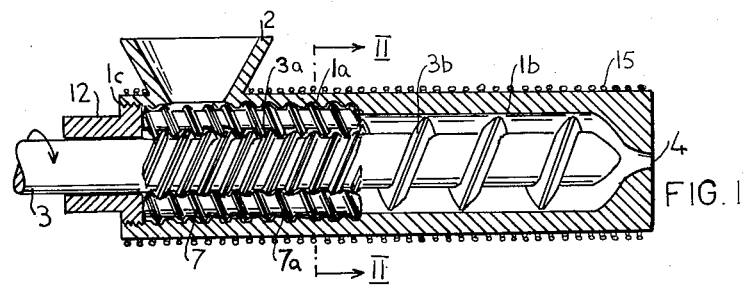
FIG. 1 is an axial sectional view of the feed mechanism of a molding machine according to my invention.
Figure 4:
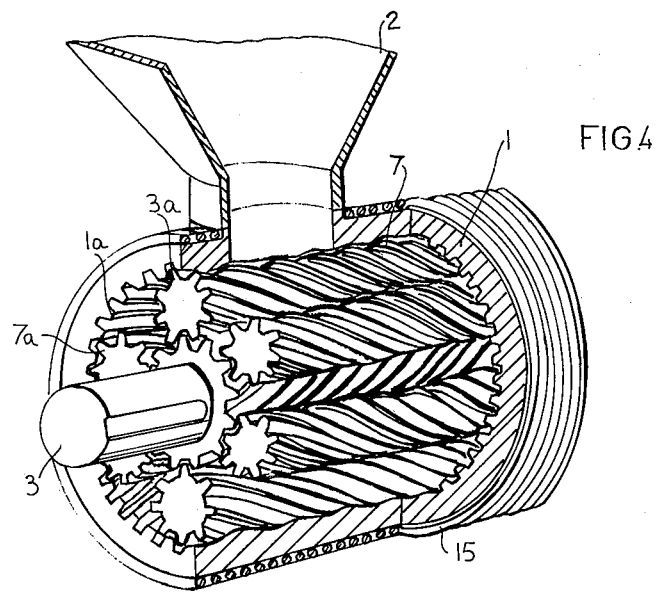
FIG. 4 is a partly cut-away perspective view of the inlet end of the feed mechanism shown in FIGS. 1 and 2.
Figure 2:
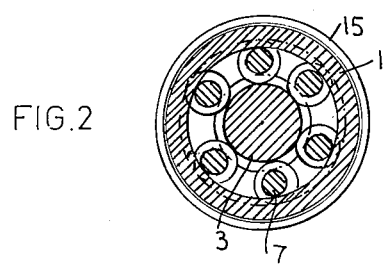
FIG. 2 is a transverse section taken along line II—II of FIG. 1.

As illustrated in FIGS. 1, 2 and 4, a feed mechanism embodying my invention comprises tubular housing 1 with external heating coil 15, this housing being provided with a charging hopper 2 at one end and with a discharge port 4 for the extruded plastic material on the other end; its internal surface has a threaded front portion 1a in the vicinity of the hopper 2, formed by a series of helical gear teeth, and a smooth rear portion 1b merging into the nozzle-shaped port 4. The front end of housing 1, in the vicinity of the funnel-shaped hopper 2, is formed with a thread 1c for the removable insertion of a tubular plug 12. A shaft 3, driven by a power source not illustrated, is rotatably lodged inside housing 1 and integral with a feed screw having a front portion 3a of relatively small diameter followed by a rear portion 3b of a relatively large diameter. A set of planetary feed screws 7 are located in the annular space between shaft 3 and housing 1, in a symmetrical array about the axis of shaft 3, and engage by their helical gear teeth 7a the complementary threads 1a of housing 1 and the threaded extension 3a of shaft 3.

Figure 3A:
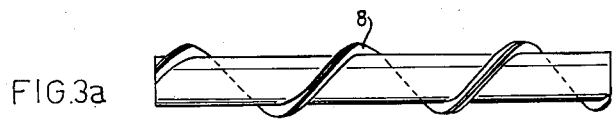
FIGS. 3a, 3b and 3c are different schematic representations of various types of thread adapted to be used on the inner and outer screws of the feed mechanism.
Figure 3C:
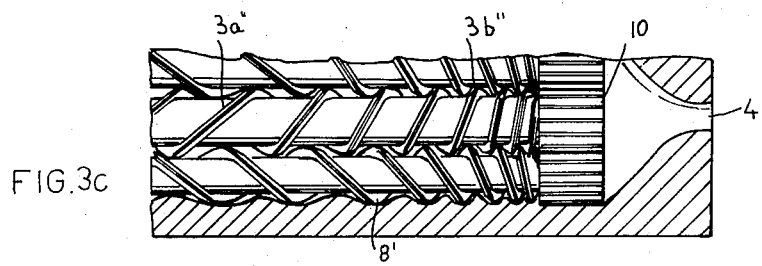
Figure 3B:
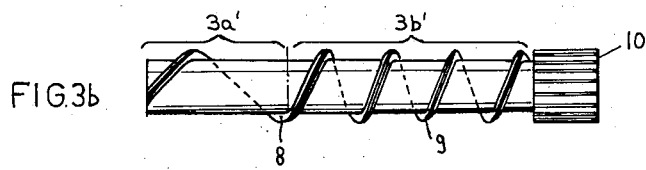

The shaft 3 may be provided with various types of thread, several alternations being respectively illustrated in FIGS. 3a, 3b and 3c. The view of the feed-screw section of the shaft shown in FIG. 3a illustrates a thread 8 with a constant pitch angle of 45°; the thread of the feed-screw of the shaft illustrated in FIG. 3b constitutes a front portion 3a' with a thread 8 of a relatively large pitch angle, an intermediate portion 3b' with a thread 9 of a smaller pitch angle, and an end portion 3c formed as a spur gear with parallel teeth 10. The thread of the shaft illustrated in FIG. 3c is similar except for the gradual transition in the pitch angle between thread 3a'' and thread 3b''; the threaded end part of this shaft is again formed as a spur gear 10. It will be understood that all of these threads co-operate with complementary threads on the surrounding feed screws, shown at 8 in FIG. 3c, which in turn mesh with the threads of the housing, shown at 9 in FIG. 3c, matching those of the center screw.

Figure 5:
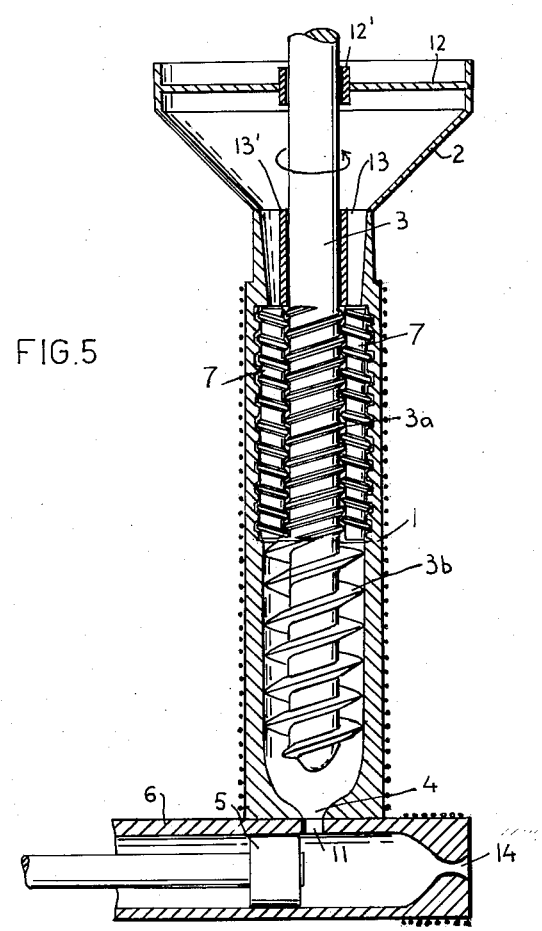
FIG. 5 is a cross-sectional view of a modified mechanism according to my invention combined with a piston-type injector.

A vertical arrangement of the feeding mechanism utilized in conjunction with a piston-type injector is illustrated in FIG. 5, the cylindrical housing 1 of the mechanism bearing on its upper end the charging hopper 2 provided with radial arms 12 and fins 13 which support bearings 12' and 13' for the shaft 3; this shaft may be similar to the one illustrated in FIG. 1 and provided with threaded portions 3a and 3b. Planetary feed screws 7 are again located inside the housing 1, surrounding the shaft 3. The lower part of housing 1 is fastened to the cylinder 6 of a piston-type injector provided with a plunger 5 and an injection nozzle 14. The injector communicates with the feed mechanism by means of opening 11 which registers with the discharge port 4 of housing 1.

Figure 6:
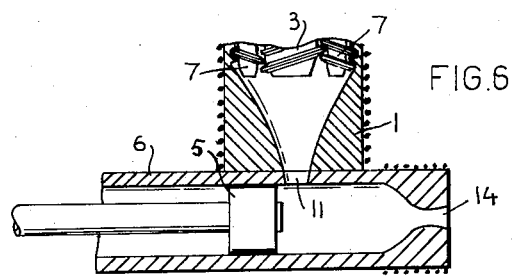
FIG. 6 is a partial view of a further embodiment of the mechanism similar to the one shown in FIG. 5.

The planetary feed screws 7 may extend along only a portion of the shaft 3 in the vicinity of the charging hopper 2, as in the foregoing embodiments, or may be coextensive with the shaft 3 to approach the discharge port 4, as shown in FIG. 6.

The use of the planetary feed screws improves the tendency of the feeding mechanism to convey the heated and liquefied molding material in a continuous flow from hopper 2 to port 4 upon rotation of the shaft 3. The mixing and kneading of the material is also improved. The pitch angle of the threads may be chosen relatively large, in order to accelerate the advance of the molding material, or somewhat smaller if more thorough mastification of the material is desired. The combination of threads with various pitch angles assures that both functions will be satisfactorily fulfilled, improves the uniformity of the conveyed material and prevents the formation of air bubbles therein. The employment of the feeding mechanism according to my invention, therefore, improves the quality of the products and leads to a decrease in the amount of rejects.

The embodiments of the invention shown in the accompanying drawing are purely illustrative of the invention, and it is to be understood that variations may be made therein without departing from the scope of the invention as defined by the appended claims.

I claim:

1. An extruding device for plastic material, comprising a tubular housing with an inlet for said material and an outlet therefor, said housing being provided with internal teeth forming threads thereon at least in the vicinity of said inlet, a central feed screw with threads matching those of said housing, and a plurality of planetary feed screws with complementary threads matingly engaging the threads of said central feed screw and said housing while being disposed in an annular space between said central feed screw and said housing, at least said central feed screw extending substantially completely through said housing and terminating at said outlet.

2. A device according to claim 1 wherein said internal teeth and said planetary feed screws extend over approximately half the length of said central feed screw, said central feed screw and said housing being shaped to reduce the width of said annular space beyond said planetary feed screws.

3. A device according to claim 1 wherein the threads of said central feed screw decrease in pitch angle from said inlet to said outlet.

4. A device according to claim 1 wherein at least said central feed screw is provided at its end near said outlet with spur-gear teeth, said planetary feed screws being substantially coextensive with said central feed screw and provided at their ends near said outlet with spur-gear teeth meshing with those of said central feed screw.

5. An extruding device for plastic material, comprising a tubular housing with an inlet for said material and an outlet therefor, said housing being provided with internal teeth forming threads thereon at least in the vicinity of said inlet, heater means in said housing in the vicinity of said inlet, a central feed screw with threads matching those of said housing, and a plurality of planetary feed screws with complementary threads matingly engaging the threads of said central feed screw and said housing while being symmetrically arrayed in an annular space between said central feed screw and said housing, at least said central feed screw extending substantially through said housing and terminating at said outlet.

References Cited in the file of this patent
UNITED STATES PATENTS

| | | |
|---|---|---|
| 111,593 | Whelpley et al. | Feb. 7, 1871 |
| 1,468,379 | Easton | Sept. 18, 1923 |
| 2,543,287 | Hoffstetter | Feb. 27, 1951 |
| 2,658,604 | Erdmenger et al. | Nov. 10, 1953 |
| 2,735,310 | McFarland | Feb. 21, 1956 |
| 2,900,848 | Henn-Collins | Aug. 25, 1959 |